No. 760,567. PATENTED MAY 24, 1904.
I. ROTHSTEIN.
ELECTROCHEMICAL GAS LIGHTER.
APPLICATION FILED MAY 12, 1903.
NO MODEL.
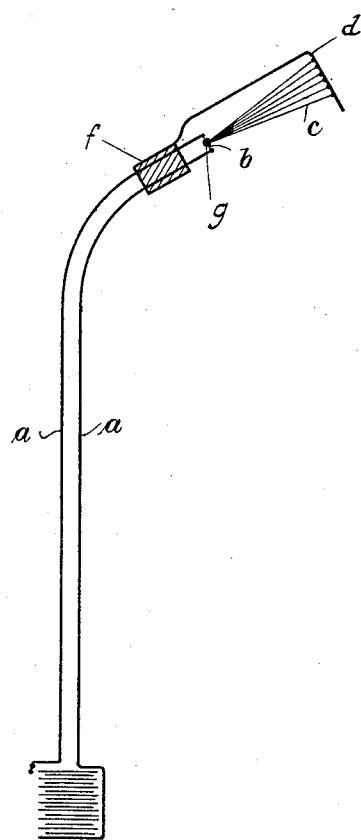
WITNESSES
INVENTOR
Ignatz Rothstein
BY
ATTORNEYS
THE NORRIS PETERS CO., PHOTO-LITHO., WASHINGTON, D. C.

No. 760,567. Patented May 24, 1904.

UNITED STATES PATENT OFFICE.

IGNATZ ROTHSTEIN, OF BERLIN, GERMANY.

ELECTROCHEMICAL GAS-LIGHTER.

SPECIFICATION forming part of Letters Patent No. 760,567, dated May 24, 1904.

Application filed May 12, 1903. Serial No. 156,804. (No model.)

*To all whom it may concern:*

Be it known that I, IGNATZ ROTHSTEIN, manufacturer, residing at Goltzstrasse 22, Berlin W., Empire of Germany, have invented certain new and useful Improvements in Electrochemical Gas-Lighters; and I do hereby declare the following to be a full, clear, and exact description of the invention, such as will enable others skilled in the art to which it pertains to make and use it, reference being had to the accompanying drawings, which form part of this specification.

The subject of my invention is a device for igniting gas-jets by means of a short platinum wire heated by the electric current. To such short wire several other platinum wires are secured and are heated by the first said wire, and therefore only indirectly by the electric current. These additional wires may be secured to a special bracket or arm or may hang down loosely and are inclosed in a perforated case to prevent their being injured.

In general, electric gas-lighters act through the generation of sparks or incandescence. The attempt has, however, already been made simply to heat by an electric current the platinum wire which is to effect lighting of the gas. The platinum wire through which the current flows has in this case also had to effect ignition and must, therefore, heat a certain definite length, which must not be decreased below a certain amount if the ignition is to be effective. A certain definite strength of current is therefore necessary.

According to my invention the wire through which the current flows does not serve to ignite the gas, and therefore is only some five millimeters long. This length would not, of course, be sufficient to ignite the current of gas. To heat it, a much lower current strength is required than in the case of prior gas-lighters. Thus since this wire does not have to effect lighting metal other than platinum can be employed, if desired. The gas is lighted by the platinum wires which are joined to the short wire through which the electric current flows. There may be any desired number of these wires and they may be of any suitable length, since they do not carry an electric current.

My invention therefore constitutes an entirely novel combination in electrochemical ignition.

One form of construction of my improved apparatus is shown in the accompanying drawing.

The two poles $a\ a$ of a voltaic battery are connected by a short platinum wire $b$, from which extend the platinum lighting-wires $c$. The outer ends of the wires $c$ are supported by the arm $d$, extending from a shell $f$, carried by the conductors $a$. These wires $c$ are arranged in the form of a cone or pyramid, having its apex at the point of junction between the wires $c$ and the wire $b$, the opposite ends of the wires $c$ being separately connected to the support $d$ and forming the base of the cone. The current passes through the wire $b$, but not through the wires $c$, the latter becoming red-hot from the wire $b$.

The operation of the apparatus is as follows: Immediately the circuit is closed the short platinum wire $b$ becomes heated, and this heat is transmitted to the platinum wire $c$, connected to it, whereby these latter wires are rendered incandescent in the gaseous stream, which is thereby ignited. In order after lighting the first jet to be able to ignite succeeding jets without the employment of the electric current, and so economize the battery, a small quantity of platinum-black is applied to the place of junction of the wires $c$ and wire $b$, as at $g$. This platinum-black is heated at the first ignition and collects sufficient heat in order to cause the wires $c$ to glow in the stream of gas, and so effect further immediate ignitions.

The heated platinum-black is not equivalent to one of the well-known ignition-pellets, which always glow of themselves in the gaseous current. The heating property is retained by the platinum-black only for a short time after the ignition, since very little and not specially-prepared platinum-black is employed.

Having thus described my invention, what I claim as new, and desire to secure by Letters Patent, is—

1. A gas-lighter comprising a source of electricity, conductors extending from the same, a short wire connecting said conductors, platinum wires extending from said short wire and an arm supported by said conductors having its outer end adapted to support the outer ends of said platinum wires beyond the ends of said conductors, substantially as described.

2. A gas-lighter comprising a source of electricity, conductors extending from the same, a short wire connecting said conductors, platinum wires extending from said short wire, a support for the outer ends of said wires, the ends of said platinum wires being united at the point of junction with said short wire, and platinum-black applied at said point of junction, the outer ends of said platinum wires being disposed at different points on said support, substantially as described.

In witness whereof I have hereunto signed my name, this 25th day of April, 1903, in the presence of two subscribing witnesses.

IGNATZ ROTHSTEIN.

Witnesses:
HENRY HASPER,
WOLDEMAR HAUPT.